United States Patent [19]
Alberts et al.

[11] Patent Number: 5,011,116
[45] Date of Patent: Apr. 30, 1991

[54] SHOCK ABSORBING SEALING MEANS FOR FLOW CONTROL DEVICES

[75] Inventors: Jack B. Alberts; Michael D. McNeely, both of Houston, Tex.

[73] Assignee: Keystone International Holdings Corp.

[21] Appl. No.: 502,047

[22] Filed: Mar. 30, 1990

[51] Int. Cl.⁵ .............. F16K 25/00; F16K 31/122; F16K 17/04
[52] U.S. Cl. .................. 251/334; 137/469; 137/488; 137/904
[58] Field of Search .......... 137/469, 474, 488, 904, 137/489.5; 251/88, 84, 85, 333, 334

[56] References Cited

U.S. PATENT DOCUMENTS

| | | | |
|---|---|---|---|
| 813,555 | 2/1906 | Hayden | 251/334 |
| 820,154 | 5/1906 | Towne | 251/334 |
| 1,654,516 | 12/1927 | Wilson | 251/334 |
| 1,671,140 | 5/1928 | Wilson | 251/334 |
| 1,679,779 | 8/1928 | Oberhuber | 251/334 |
| 1,781,771 | 11/1930 | Wilson | 251/334 |
| 1,800,127 | 4/1931 | Wilson | 251/334 |
| 1,847,385 | 3/1932 | Dengler | 251/334 |
| 1,878,222 | 9/1932 | Wilson | 251/334 |
| 2,163,472 | 6/1939 | Shimer | 137/904 |
| 2,628,632 | 2/1953 | Dayton | 137/469 |
| 2,643,671 | 6/1953 | Dayton | 137/469 |
| 3,063,467 | 11/1962 | Toberts, Jr. et al. | 251/334 |
| 3,141,474 | 7/1964 | Gentzel | 137/469 |
| 3,211,174 | 10/1965 | Weise et al. | 137/469 |
| 3,430,646 | 3/1969 | Vick | 137/469 |
| 3,433,250 | 3/1969 | Hagihara | 137/469 |
| 3,702,141 | 11/1972 | Wetterhorn | 137/469 |
| 4,188,013 | 2/1980 | Battersby et al. | 251/333 |
| 4,296,307 | 10/1981 | Hagihara | 137/469 |
| 4,671,487 | 6/1987 | Bragin et al. | 251/84 |
| 4,858,642 | 8/1989 | Fain, Jr. | 137/474 |

Primary Examiner—George L. Walton
Attorney, Agent, or Firm—Dodge Bush & Moseley

[57] ABSTRACT

A flow control device illustrated as a pressure relief valve (10, 10A) has a reciprocable valve member (22, 22A) for seating on a face (20, 20A) of a fixed seat ring (18, 18A). The valve member (22, 22A) includes a hub (36, 36A), an outer seal ring (38, 38A), and a flexible connecting member (40, 40A) extending between and connecting the seal ring (38, 38A) and the hub (36, 36A). Upon seating or reseating of valve member (22, 22A) seal ring (38, 38A) contacts fixed seat ring (18, 18A) and flexible connecting member (40, 40A) flexes upon relative movement of the hub (36, 36A) after initial contact of the seal ring (38, 38A) with the fixed seat ring (20, 20A) to act as a shock absorber for absorbing impact forces.

30 Claims, 3 Drawing Sheets

SHOCK ABSORBING SEALING MEANS FOR FLOW CONTROL DEVICES

BACKGROUND OF THE INVENTION

This invention relates to shock absorbing sealing means for flow control devices, and more particularly to shock absorbing sealing means for reciprocable flow control members of flow control devices such as valves.

Heretofore, such as shown in U.S. Pat. No. 3,433,250 dated Mar. 18, 1969, safety relief valves have been provided with means to absorb at least some of the impact forces upon reseating of a valve disk. However, upon reseating of the valve disk, substantial radial deflection may occur after initial line contact of the disk sealing face with the fixed seat ring. Such radial deflection is undesirable and oftentimes results in undue wear and possible damage to the contacting faces.

Also, shock absorbing sealing means for flow control devices such as valves, have utilized elastomeric members for absorbing shock. For example, U.S. Pat. No. 4,858,642 dated Aug. 22, 1989 shows a pressure operated relief valve in which an elastomeric member is positioned between a valve disc and a disc holder to absorb shock forces upon seating of the valve member resulting from a reduction in pressure for actuation of the valve member. Elastomeric members are subject to deterioration at high temperatures, such as temperatures over around 500 F. for example.

Other impact type valves have utilized fluid metering for absorbing shock force upon impact of the valve member against a valve seat or for reducing the speed of movement of the valve member prior to impact thereby to minimize impact forces. Such fluid metering arrangements are costly, relatively complex, and do not usually absorb all of the impact forces.

SUMMARY OF THE INVENTION

The present invention is directed to a flow control device in which a longitudinally movable flow control member seats against a seat with at least some of the impact forces being absorbed after contact of the movable flow control member against the seat. To minimize wear, damage, leakage, and the like to impacting members, it is desirable that the impact forces or energy generated by impact be dissipated or absorbed with minimal radial deflection between contacting faces.

The present invention illustrates a preferred embodiment of a flow control device as a valve including a reciprocable valve member having a hard seal ring for contacting a hard seat ring upon seating or reseating of the valve member. A flexible connecting member extends in a generally radial direction between the outer annular seal ring and the valve hub. The flexible connecting member permits by flexure thereof a cushioned longitudinal movement of the valve hub or body after contact of the seal ring with the seat ring to absorb impact forces. The connecting member is inclined a predetermined amount from a true radial relation to control radial deflection of the seal ring. Bending moments are exerted at the hinging or joining of opposite ends of the flexible connecting member to the valve hub and to the metal seal ring. Thus, the size of the flexible connecting member and the seal ring may be predetermined depending on the specifications and operating parameters for the valve structure.

It is an object of this invention to provide shock absorbing means for a high temperature flow control device having a flow control member movable along a longitudinal axis and seating against a seat ring.

It is a further object of this invention to provide shock absorbing means for such a flow control device having a seal ring connected to a hub through a flexible connection and positioned radially outward of the hub for contacting a seat ring.

An additional object is to provide such a flow control member in which a flexible connecting member extends in a generally radial direction between the hub and the outer seal ring for absorbing impact forces upon flexure thereof after initial contact of the seal ring against a fixed seat ring.

Other objects, features, and advantages of the invention will be in part apparent and in part pointed out hereinafter.

DESCRIPTION OF THE INVENTION

Figures 1, 3:
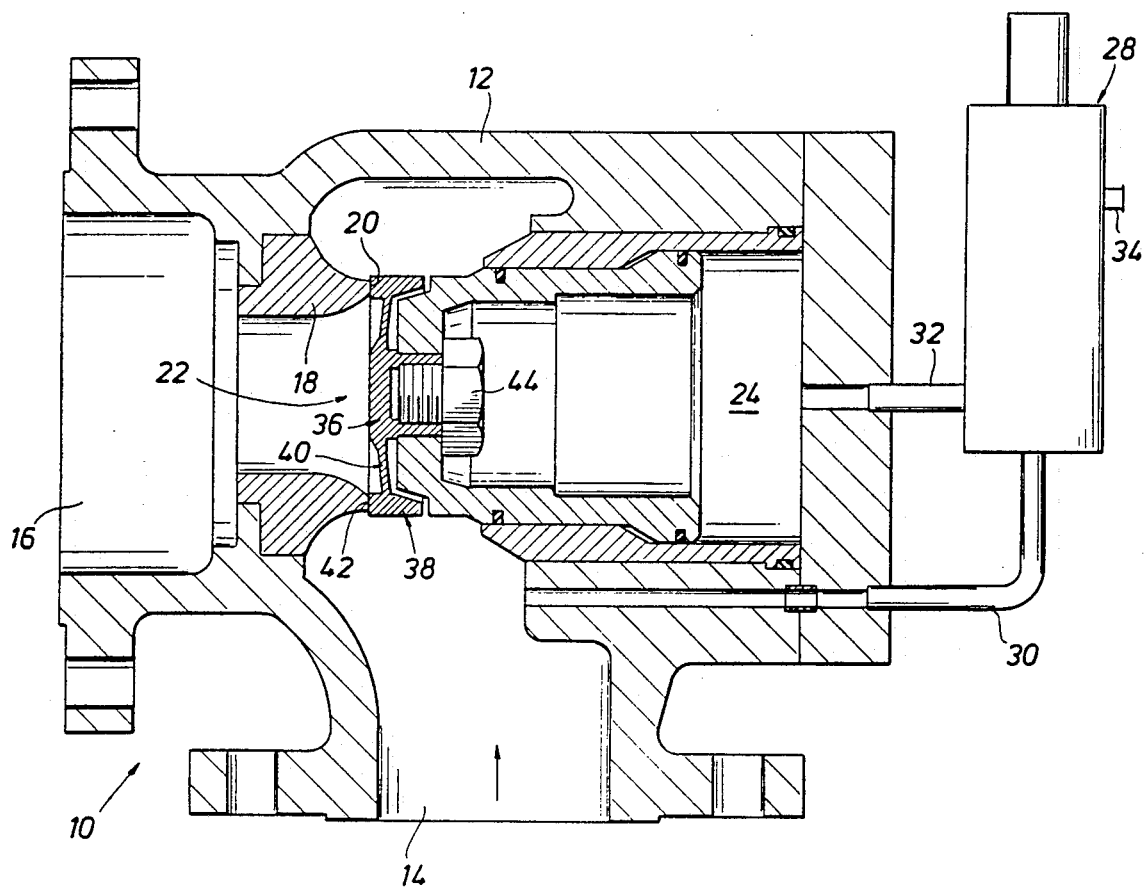
FIG. 1 is a cross section of a pilot operated pressure relief valve with the improved shock absorbing sealing means of this invention shown in a closed position.
FIG. 3 is an enlarged view of the reciprocable valve member of FIGS. 1 and 2 removed from the valve body.

Referring now to the drawings and more particularly to the embodiment of a flow control device shown in FIGS. 1-4, a pilot operated safety relief valve is shown generally at 10 having a valve body 12 defining an inlet flow passage at 14 and an outlet flow passage at 16. A nozzle or seat ring is shown generally at 18 and has a generally planar seat face at 20. An improved fluid operated reciprocable valve member is generally indicated at 22 having a dome chamber 24 therein and mounted for movement between open and closed positions. A metering or dampening chamber is shown at 26 to reduce the impact of valve member 22 against seat ring 18 when moving to closed position after being opened. A pilot valve for controlling relief valve 10 is shown schematically at 28 having an inlet line 30 in fluid communication with inlet 14 and a dome line 32 extending to dome chamber 24. An exhaust or discharge line 34 extends to atmosphere.

Figure 2:
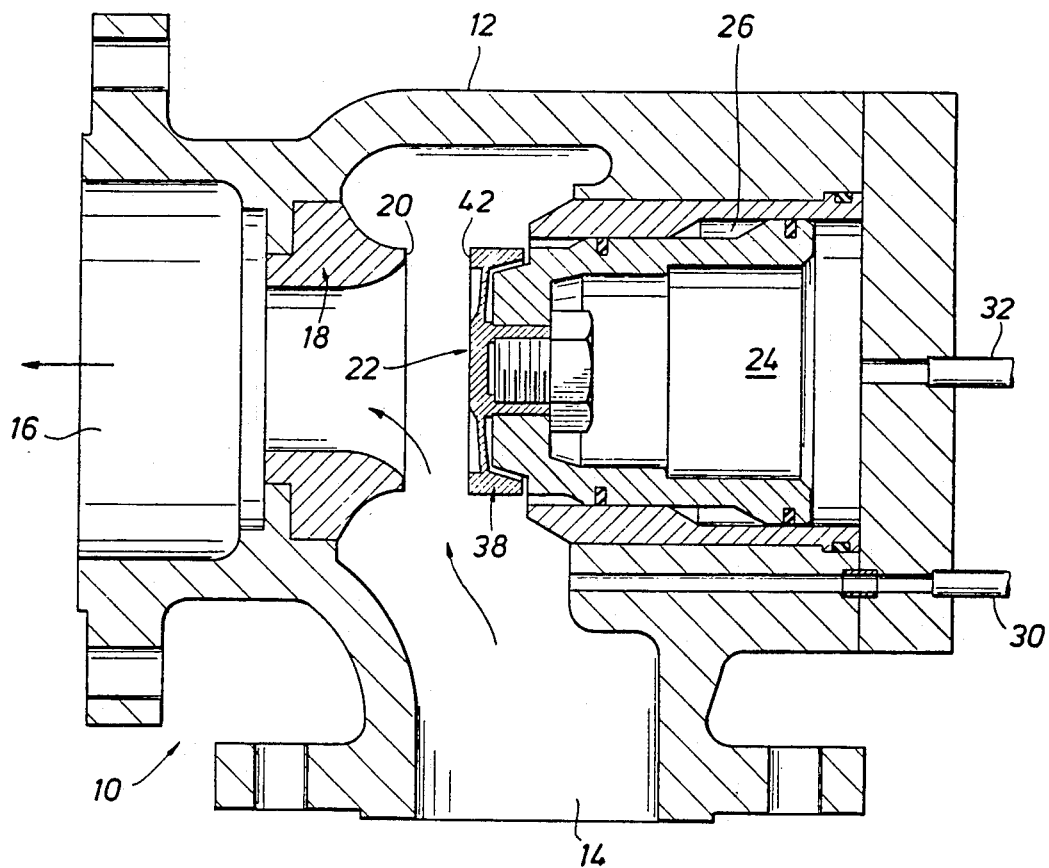
FIG. 2 is a cross section of the pilot operated pressure relief valve shown in FIG. 1 with the valve member shown in an open position to permit fluid flow through the valve for relieving fluid pressure.

Improved fluid operated valve member 22 forms an important part of this invention and includes a body 35 having a disk including central hub shown generally at 36, an outer seal ring shown generally at 38, and a flexible connecting member shown generally at 40 extending between and connecting hub 36 to seal ring 38. Seal ring 38 has a planar sealing face 42 between radially inner and outer peripheral surfaces thereof adapted to contact and seat on face 20 of seat ring 18 upon closing of valve member 22 after opening thereof. Valve member 22 moves to an open position as shown in FIG. 2 resulting from a predetermined high fluid pressure being reached in inlet passage 14 sensed by pilot line 30. Upon a reduction in fluid pressure in inlet fluid passage 14 as sensed by pilot valve 28, valve member 2 reseats on seat ring 18. Oftentimes, even with dampening of the movement of valve member 22, and particularly upon a relative fast reduction in fluid pressure in fluid inlet passage 14 after opening, valve member 22 moves rapidly to closed seated position to exert impact forces against seat ring 18. Impact forces may cause abnormal wear or damage which could effect fluid leakage in the closed position of valve member 22.

The present invention utilizes a flexible connecting member 40 between hub 36 and the inner radial periphery of outer seal ring 38 which flexes after initial contact of seal ring 38 with seat ring 18 for absorbing impact forces. Flexible connecting member 40 is constructed and arranged for a predetermined flexure relative to seal ring 38 for absorbing impact forces with minimal radial and angular deflection of sealing face 42 on seal ring 38 and for providing alignment between faces 20 and 42.

Figure 4:
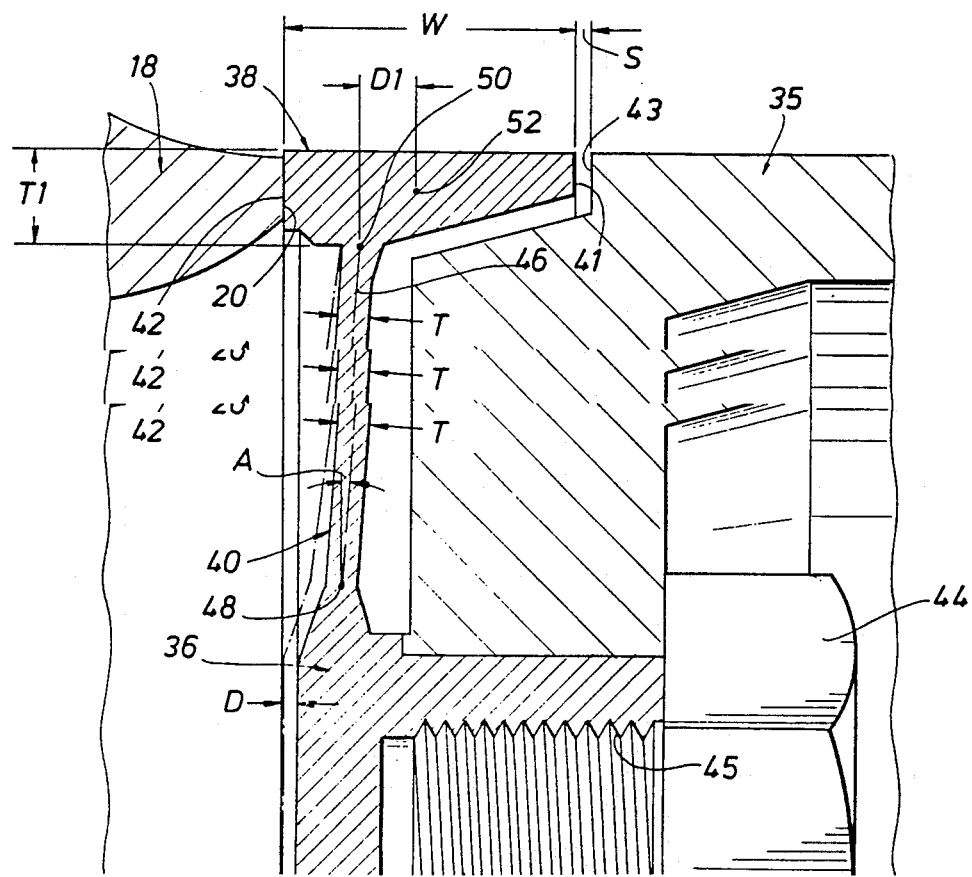
FIG. 4 is an enlarged fragment of FIG. 3 illustrating particularly the sizing of the members forming the shock absorbing sealing means of the present invention and showing in broken lines the final position of the valve member after flexing of the connecting member.

As shown in FIG. 4, central hub 36 of valve member 22 moves an axial distance D after contact of seal face 42 with seat face 20. Distance D is at least greater than around 0.002 inch and may be as high as around 0.030 inch or greater depending primarily on such factors as the size of valve member 22 and various operating parameters. Seat ring 38 has a planar rear face 41 and valve member body 35 has an opposed face 43 normally spaced from face 41 and acting as a stop upon contact with rear face 41 to limit the maximum travel S of hub 36 past the elastic limit of connecting member 40 after seat face 20 is contacted by seal ring 38.

Hub 36 is secured to body 35 of valve member 22 by a threaded bolt shown at 44 threaded within an internally threaded opening 45 in hub 36. Longitudinal axis of flexible connecting member 40 is shown at 46. Connecting member 40 is hinged to hub 36 at point 48, and hinged to seal ring 38 at 50. The thickness of connecting member 40 is indicated at T.

Seal ring 38 has a maximum thickness indicated at T1, and a width indicated at W. The center of gravity of seal ring 38 is indicated at 52 and is offset an axial distance D1 from the center line of connecting member 40 at hinge point 50 in a direction away from or longitudinally outwardly of seal face 42. Such an offset has been found desirable in order to minimize any angular or radial deflection of seal face 42 upon flexing of connecting member 40 resulting from movement of hub 36 after seal face 42 contacts seat face 20. An offset distance D1 of at least around 0.050 inch is believed desirable in order to minimize the deflection of the seal face 42 to an insignificant amount.

Further, in order for the flexing of connecting member 40 to maintain alignment of seal face 42 against seat face 20 upon impacting of seal ring 38 against seat ring 18, it is desirable that the maximum thickness T1 of seal ring 38 be at least around twice the thickness T of connecting member 40, and that the total width W of seal ring 38 be at least around three times the thickness T of connecting member 40. Additionally, in order to minimize the angular and radial deflection of face 42 upon flexure of connecting member 40, the longitudinal axis 46 of connecting member 40 is inclined rearwardly to provide a negative slope shown at angle A. It is believed that angle A should be between around one-half degree and ten degrees in order to obtain a satisfactory result.

Planar face 42 is of a width greater than the width of planar face 20 for the most effective sealing action and with minimal radial and angular deflections occurring after contact. Such an arrangement accommodates any lack of concentricity between rings 18 and 38. It is noted that seal face 42 is wider than seat face 20 since seal face 42 is formed of a harder face material.

It is apparent from the above that the design of the flexible connecting member 40 between seal ring 38 and hub 36 may be predetermined in order to have sufficient flexure to absorb the impact forces while minimizing the deflection of seal face 42. While hub 36, connecting member 40, and seal ring 38 are shown as an integral construction, it is to be understood that connecting member 40 may be formed of a separate member, if desired, such as a Belleville washer.

While metal is a preferred material from which the present invention is formed, it is to be understood that other hard materials resistant to high temperature, such as certain types of ceramic and composite materials, may be utilized in a satisfactory manner. The term "hard" as used in the specification and claims herein is interpreted as being "non-elastomeric".

Figure 5:
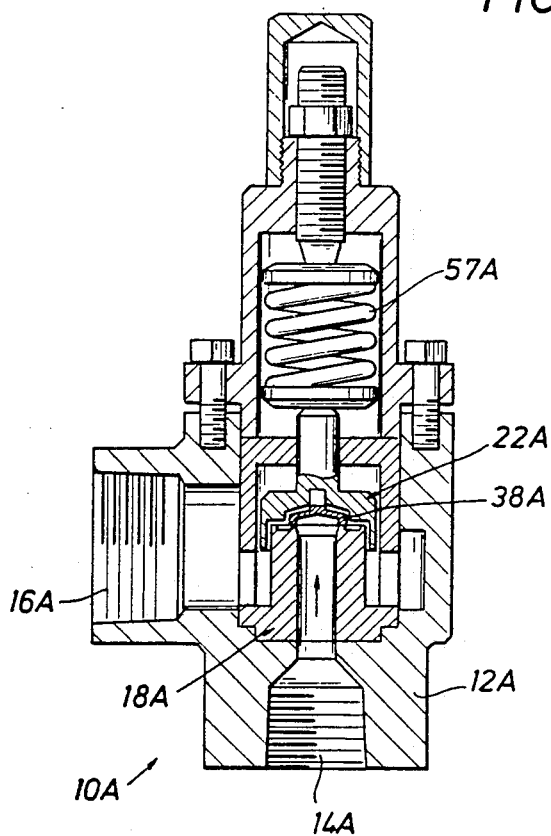
FIG. 5 is a cross section of another embodiment of the present invention showing a non-pilot operated pressure relief valve in closed position.
Figure 6:
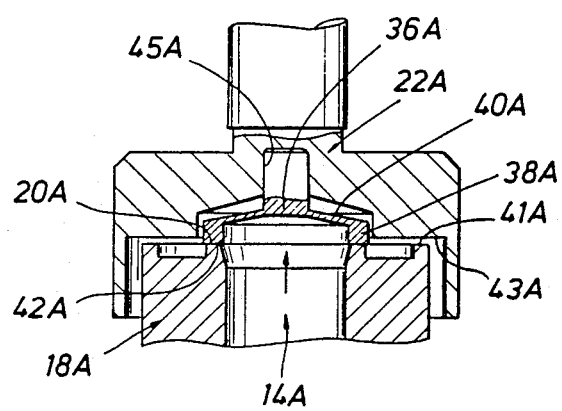
FIG. 6 is an enlarged fragment of FIG. 5 showing the shock absorbing sealing means of the present invention.
Figure 7:
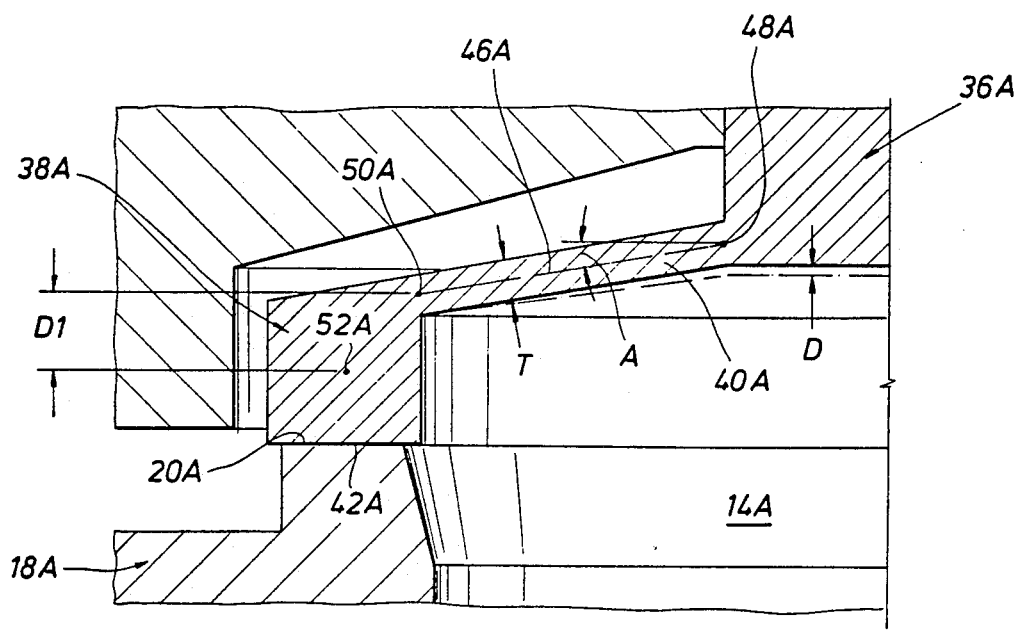
FIG. 7 is an enlarged section of the shock absorbing sealing means showing a portion thereof in seated position with the connecting member shown in broken lines in flexed position for absorbing impact forces after seating of the sealing means.

Referring now to FIG. 5-7, another embodiment of the present invention is illustrated for a pressure relief valve which is not pilot operated. Pressure relief valve 10A has a valve body 12A including an inlet flow passage 14A and an outlet flow passage 16A. A nozzle or seat ring 18A has a planar sat face 20A. A spindle 22A has a bore 45A.

Improved pressure relief valve 10A includes hub 36A fitted within bore 45A, a seal ring 38A, and a flexible connecting member 40A. A spring 57A urges spindle 22A and seal ring 38A into seated position on face 20A of seat ring 18A. Upon a predetermined high fluid pressure being reached in inlet fluid passage 14A, spindle 22A and seal ring 38A are forced outwardly against the bias of spring 57A to permit fluid flow through fluid passage 16A. Upon a reduction in fluid pressure in inlet 14A, spindle 22A under the bias of spring 57A moves seal ring 38A to reseated position on face 20A of seat ring 18A.

Flexible connecting member or web 40A functions in the same manner as the embodiment of FIG. 1-4 and is generally identical to the embodiment of FIG. 1-4 except for the slope of connecting member 40A shown at angle A and the location of the center of gravity shown at point 52A. The longitudinal axis 46A of connecting member 40A has a positive slope shown at angle A between hinge points 48A and 50A. Angle A is generally equal to angle A in the embodiment of FIGS. 1-4 but slopes in a direction toward face 42A instead of away from face 42A as in the embodiment of FIGS. 1-4. Additionally, in order to minimize deflection of face 42A after contact against face 20A, the center of gravity 52A of seal member 38A is positioned forwardly of hinge point 50A toward face 42A as shown at D1. Distance D1 is generally identical to the distance D1 in the embodiment shown in FIGS. 1-4 except in an opposite direction thereby to minimize the deflection of face 42A resulting from the flexing of connecting member 40A. Hub 36A moves a distance D as in the embodiment of FIGS. 1-4 and faces 41A and 43A engage in abutting contact to limit the movement of hub 36A past the elastic limit of connecting member 40A.

While the present invention has been illustrated for utilization with pressure relief valves, it is to be understood that this invention could be utilized with other types of fluid flow control devices, such as pumps, check valves, and the like where a reciprocable flow control member is provided for seating and reseating against an annular seat ring. Thus, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a fluid operated valve having a valve body including a flow passage and a hard annular seat ring mounted within the valve body about the flow passage;
an improved fluid pressure responsive reciprocable valve member mounted within the valve body for movement between open and closed positions relative to said flow passage and adapted to seat in closed position on said hard seat ring and to exert an impact force against said hard seat ring when seating thereon in response to fluid pressure changes, said improved valve member comprising:
a central hub;
a hard outer annular seal ring having radially inner and outer peripheral surfaces and spaced radially from said central hub for seating in face-to-face contact relation with said seat ring in the closed position of said valve member; and
a flexible connecting member extending in a generally radial direction between said hub and said radially inner peripheral surface of said seal ring, said connecting member flexing between said hub and said inner peripheral surface of said outer seal ring after initial contact of said hard seal ring with said hard seat ring to absorb impact loads resulting from contact of said hard seal ring against said hard seat ring without substantial movement of said hard seal ring.

2. In a fluid operated valve as set forth in claim 1;
said seal ring and said seat ring having generally planar sealing faces in contact with each other in the closed position of said valve member.

3. In a fluid operated valve as set forth in claim 1;
said connecting member being slanted from said hub to said seat ring a predetermined amount in a direction at right angles to a radial direction thereby to provide increased resistance to radial deflection of said seal ring after initial contact of said seal ring against said seat ring.

4. In a fluid operated valve as set forth in claim 3;
said connecting member being hinged at opposed ends thereof to said hub and to said seal ring.

5. In a fluid operated valve as set forth in claim 3;
said connecting member being slanted in a direction away from said hard seat ring with the center of gravity of said hard seal ring being positioned axially outwardly of said connecting member relative to said hard seat ring for minimizing radial deflection of the seal ring.

6. In a fluid operated valve as set forth in claim 3;
said connecting member being slanted in a direction toward said hard seat ring with the center of gravity of said seal ring being positioned axially inwardly of said connecting member relative to said hard seat ring for minimizing radial deflection of the seal ring.

7. In a fluid operated valve as set forth in claim 1;
said hub of said valve member moving axially a distance between around 0.002 inch and 0.030 inch after initial contact of said seal ring with said seat ring to effect flexing of said connecting member.

8. In a fluid operated valve as set forth in claim 1;
said hub and said connecting member being integral.

9. In a fluid operated valve as set forth in claim 1;
said seal ring and said connecting member being integral.

10. In a fluid operated valve as set forth in claim 1;
said hub, said seal ring, and said flexible connecting member being a one piece integral structure.

11. In a fluid operated valve as set forth in claim 1;
said seal ring having a width as measured in a direction parallel to the longitudinal axis of said valve member at least around three times the thickness of said connecting member, and having a thickness as measured in a direction transverse to the longitudinal axis of said valve member at least around twice the thickness of said connecting member.

12. In a fluid operated flow control device having a body including a flow passage and a hard annular seat ring mounted within the valve body about the flow passage;
an improved fluid pressure responsive reciprocable flow control member mounted within the body for movement between open and closed positions relative to said flow passage and adapted to seat in closed position on said hard seat ring and to exert an impact force against said hard seat ring when seating thereon in response to fluid pressure changes, said improved flow control member comprising:
a central hub;
a hard outer annular seal ring having radially inner and outer peripheral surfaces and spaced radially from said central hub for seating in face-to-face contact relation with said seat ring in the closed position of said flow control member; and
a flexible connecting member extending in a generally radial direction between said hub and said radially inner peripheral surface of said seal ring, said connecting member flexing between said hub and said inner peripheral surface of said outer seal ring after initial contact of said hard seal ring with said hard seat ring and subsequent longitudinal movement of said hub relative to said seal ring an amount sufficient to absorb impact loads resulting from contact of said hard seal ring against said hard seat ring without substantial movement of said hard seal ring.

13. In a fluid operated flow control device as set forth in claim 12;
the maximum thickness of said seal ring as measured in a direction transverse to the longitudinal axis of said flow control member being at least around twice the thickness of said flexible connecting member.

14. In a fluid operated flow control device as set forth in claim 12;

said hub, said seal ring, and said connecting member being an integral one piece construction.

15. In a fluid operated flow control device as set forth in claim 14;
said seal ring having a width as measured in a direction parallel to the longitudinal axis of said flow control member at least around three times the thickness of said connecting member.

16. In a fluid operated pressure relief valve having a valve body including a flow passage and a fixed annular metal seat ring mounted within the valve body about the flow passage;
an improved fluid pressure responsive reciprocable pressure relief valve member mounted within the valve body for movement between open and closed positions relative to said flow passage and adapted to seat in closed position on said fixed metal seat ring and to exert an impact force against said metal seat ring when seating thereon, said improved pressure relief valve member comprising:
a central hub;
an outer annular metal seal ring having radially inner and outer peripheral surfaces and spaced radially from said central hub for seating in metal-to-metal contact relation with said fixed metal seat ring in the closed position of said valve member; and
a flexible connecting member extending in a generally radial direction between said hub and said radially inner peripheral surface of said seal ring, said connecting member flexing between said hub and said inner peripheral surface of said outer seal ring after initial contact of said metal seal ring with said metal seat ring and subsequent longitudinal movement of said hub relative to said seal ring to absorb impact loads resulting from contact of said metal seal ring against said metal seat ring without substantial movement of said hard seal ring.

17. In a fluid operated pressure relief valve as set forth in claim 16;
said hub moving relative to said seal ring after contact of said seal ring with said seat ring an amount at least around 0.002 inch; and
the maximum thickness of said seal ring as measured in a direction transverse to the longitudinal axis of said valve member is at least around twice the thickness of said connecting member.

18. In a fluid operated pressure relief valve as set forth in claim 16;
said hub, said seal ring, and said connecting member being an integral one piece metal construction.

19. In a fluid operated flow control device having a body defining a fluid flow passage;
a hard annular seat ring within said body about said flow passage;
a fluid pressure responsive reciprocable flow control member mounted within the body for movement between open and closed positions relative to said flow passage;
a hard seal ring on said flow control member adapted to seat in closed position on said hard seat ring to exert an impact force against said hard seat ring when seating thereon;
a flexible connecting member hingedly connected at one end to a radial peripheral surface of one of said rings and extending in a generally radial direction from said one ring; and
means hingedly connecting the other end of said flexible member for relative flexing movement of said flexible member between said ends thereof upon axial movement of said one ring resulting from impact of said flow control member against said hard annular seat ring and subsequent longitudinal movement of said flow control member an amount sufficient to absorb impact loads exerted against said hard annular seat ring, said one ring having a width as measured in a direction parallel to the longitudinal axis of said flow control member at least around three times the thickness of said connecting member.

20. In a fluid operated flow control device as set forth in claim 19;
said seal ring and said seat ring having generally planar contacting faces with the contacting face of said seal ring being of a width greater than the width of said contacting face on said seat ring, said planar contacting faces initially contacting each other along substantially the entire width of said seat ring face and providing minimal deflection between said contacting faces.

21. In a fluid operated flow control device as set forth in claim 20;
said one ring being said seal ring and mounted on said flow control member.

22. In a fluid operated flow control device as set forth in claim 19;
the maximum thickness of said one ring as measured in a direction transverse to the longitudinal axis of said flow control member being at least around twice the thickness of said flexible contacting member.

23. In a fluid operated flow control device having a body including a flow passage and a fixed annular metal seat ring mounted within the valve body about the flow passage;
an improved fluid pressure responsive reciprocable flow control member mounted within the body for movement between open and closed positions relative to said flow passage and adapted to seat in closed position on said metal seat ring and to exert an impact force against said metal seat ring when seating thereon, said improved flow control member comprising:
a central hub;
an outer annular metal seal ring having radially inner and outer peripheral surfaces and spaced radially from said central hub for seating in face-to-face contact relation with said metal seat ring in the closed position of said flow control member; and
a flexible connecting member extending in a generally radial direction between said hub and said radially inner peripheral surface of said seal ring, said connecting member flexing between said hub and said radially inner peripheral surface of said outer seal ring after initial contact of said metal seal ring with said metal seat ring and subsequent longitudinal movement of said hub relative to said seal ring an amount at least around 0.002 inch to absorb impact loads resulting from contact of said metal seal ring against said metal seat ring without substantial movement of said metal seal ring.

24. In a fluid operated flow control device as set forth in claim 23;
the maximum thickness of said metal seal ring as measured in a direction transverse to the longitudinal axis of said flow control member being at least around twice the thickness of said flexible connecting member.

25. In a fluid operated flow control device as set forth in claim 23;

said hub, said seal ring, and said connecting member being an integral one piece metal construction.

26. In a fluid operated flow control device as set forth in claim 25;

said seal ring having a width as measured in a direction parallel to the longitudinal axis of said flow control member at least around three times the thickness of said connecting member.

27. In a fluid operated flow control device controlled by a pilot valve and having a body defining a fluid flow passage;

a hard metal annular seat ring within said body about said flow passages;

a fluid pressure responsive reciprocable flow control member mounted within the body for movement between open and closed positions relative to said flow passage;

a hard metal seal ring on said flow control member adapted to seat in closed position on said hard seat ring to exert an impact force against said hard seat ring when seating thereon;

a flexible connecting member hingedly connected at one end to a radial peripheral surface of one of said rings and extending in a generally radial direction from said one ring; and means hingedly connecting the other end of said flexible member for relative flexing movement of said flexible member between said ends thereof upon axial movement of said one ring resulting from impact of said flow control member against said metal seat ring and subsequent longitudinal movement of said flow control member an amount at least greater than around 0.002 inch to absorb impact loads exerted against said metal seat ring;

said metal seal ring and said metal seat ring having generally planar contacting faces with the contacting face of said one ring being of a width greater than the width of the contacting face on the other ring, said planar contacting faces initially contacting each other along substantially the entire width of said other ring face and providing minimal deflection between said contacting faces, said one ring having a width as measured in a direction parallel to the longitudinal axis of said flow control member at least three times the thickness of said connecting member.

28. In a fluid operated flow control device as set forth in claim 27, the maximum thickness of said one ring as measured in a direction transverse to the longitudinal axis of said flow control member being at least around twice the thickness of said flexible connecting member.

29. In a fluid operated flow control device as set forth in claim 28, said one metal ring and said connecting member being of a one piece metal construction.

30. In a fluid operated flow control device as set forth in claim 27;

said one ring having a center of gravity offset at least around 0.050 inch in a direction parallel to the longitudinal axis of said reciprocable flow control member from the hinge point of said flexible connecting member to said radial peripheral surface of said one ring.

* * * * *